United States Patent Office 2,851,346
Patented Sept. 9, 1958

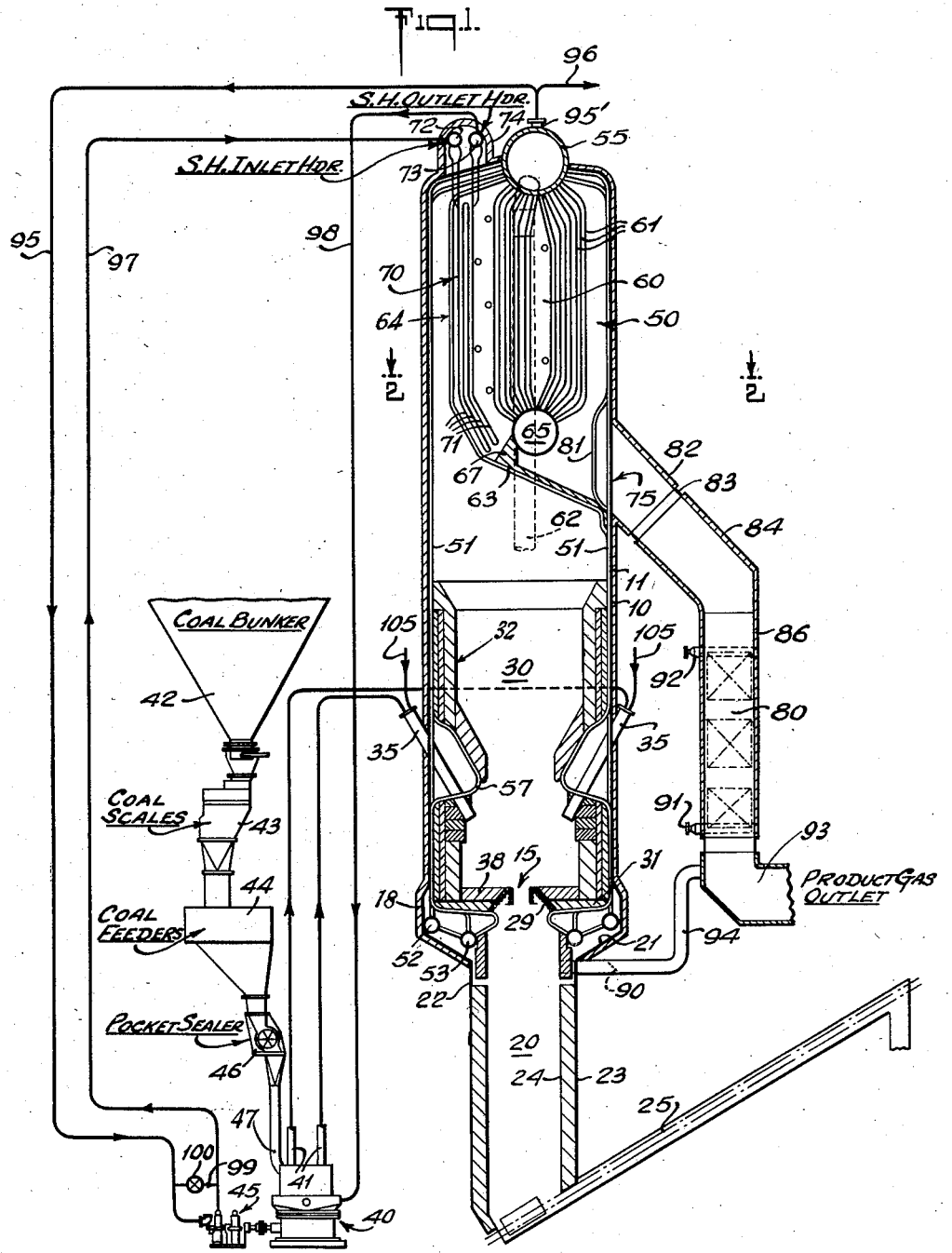

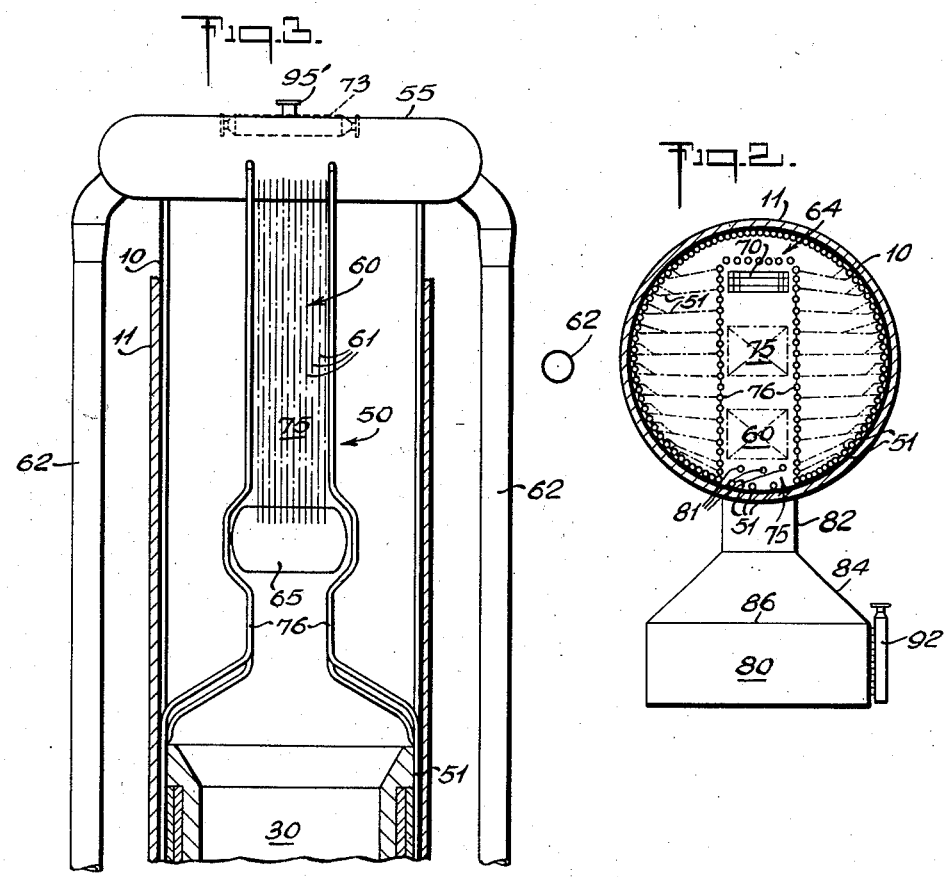

2,851,346

PULVERIZED FUEL GASIFIER USING EXHAUST OF STEAM POWERED PULVERIZER AS FUEL CARRIER MEDIUM

Theodore S. Sprague, Hewlett, N. Y., assignor to The Babcock & Wilcox Company, New York, N. Y., a corporation of New Jersey Application December 7, 1953, Serial No. 396,696

4 Claims. (Cl. 48—206)

This invention relates to a method of and apparatus for gasifying a carbon containing solid fuel by the reaction of such fuel, in the pulverized condition, with steam and a free oxygen-containing gas to produce a synthesis gas. More particularly, the invention is directed to such a method and apparatus involving the generation of steam, the utilization of energy from the generated steam to pulverize the solid fuel, the reheating of the thus utilized steam, and the use of the reheated steam to convey the pulverized fuel into a synthesis gas reaction chamber and to provide the process steam requirements, with either or both the steam generation and reheating being effected by extraction of heat from the resulting synthesis gas.

The invention method and apparatus are particularly adapted for use with the two zone reaction process and apparatus described and claimed in the copending application of P. R. Grossman and T. S. Sprague, Serial No. 225,346, filed May 10, 1951, for "Method of and Apparatus for Gasification of Pulverized Coal," and will be described with particular reference to the process and apparatus of such application. It should be understood, however, that such particular cooperation is exemplary only, and not by way of limitation, as the invention method and apparatus are useful with other synthesis gas reactors as well as with other combustion arrangements.

The reaction of the pulverized coal with steam and $CO_2$ is endothermic in nature, thus requiring a net heat input to raise the temperature of the reactants to the optimum reaction temperature range. This temperature increase may be effected by an initial exothermic reaction involving partial combustion of the coal utilizing a quantity of oxygen insufficient for complete combustion.

The most effective temperature range for the endothermic reaction is in excess of 2000° F., and the combustion temperature must be substantially above this range to insure that enough sensible heat be imparted to the reactants to maintain the temperature in the range during which gasification progresses rapidly.

As a result of these foregoing considerations, the temperature of the synthesis gas produced is relatively high and may be of the order of 2000° F. or more. The sensible heat of the exiting gases must be extracted to cool the synthesis gas to a much lower handling temperature, for example, of the order of 400° F.

The use of a superheated steam generator to extract heat from the synthesis gas is particularly advantageous in a gas synthesis process utilizing coal, such as that described and claimed in said copending application. In such case, the steam generator not only provides a supply of superheated process steam at a controlled optimum temperature but also reduces the temperature of the delivered synthesis gas to an optimum low value to assure a good overall thermal efficiency of the unit and provides a supply of steam generally in excess of the synthesis process requirements so that steam is available for other process or power work. For the foregoing reasons, a steam generator is preferably integrated with the synthesis gas reaction chamber or unit, in the present invention, and is disposed in the flow path of the gases leaving the reaction chamber to extract heat from such gases to generate steam.

The reduction of the solid fuel to the pulverized state for use in the gasification process requires power, such pulverizing being conveniently effected by a steam-driven pulverizer. Accordingly, and in accordance with the present invention, steam from the steam generator is used in the pulverizing of the solid fuel, as by powering a turbine for driving a pulverizer. The exhaust steam from the pulverizing operation is reheated in a steam heater, or superheater, which may be separately fired but which is preferably disposed in the flow path of the synthesis gas. This reheated steam is then utilized as a conveying medium to feed the pulverized fuel from the pulverizer to the gasification or reaction chamber or unit.

Normally, mechanical pulverizers are air-swept to convey the pulverized fuel from the pulverizer to burners. In accordance with the present invention, the reheated steam is used to sweep the pulverizer with steam, rather than with air, and thus convey the pulverized fuel to the burners in suspension in a fluid stream of the reheated or superheated steam. The steam thus utilized to carry the pulverized fuel also provides the steam requirements of the gasification process. Preferably, saturated steam at a relatively high pressure is utilized to drive the turbine for the pulverizer, and the exhaust steam from the turbine is fed to a superheater where it is heated to a high temperature, but at a relatively low pressure. This superheated, relatively low pressure, steam is then fed through the pulverizer to entrain the pulverized fuel and convey it into the reaction unit, where the oxygen-containing gas is admixed with the steam and coal for the synthesis gas reaction.

For an understanding of the invention principles, reference is made to the following description of a typical embodiment thereof as illustrated in the accompanying drawings.

In the drawings:

Fig. 1 is a partially schematic vertical elevation view of an integrated synthesis gas reaction unit and steam generator and superheater embodying the invention;

Fig. 2 is a horizontal sectional view of the invention apparatus taken on the line 2—2 of Fig. 1; and Fig. 3 is a partial vertical elevation view of the apparatus of Fig. 1 taken on a plane at right angles to the plane of Fig. 1.

Referring to the drawings, the reaction unit 30 and the steam generator 50 associated therewith are substantially completely enclosed within an upright enlongated cylindrical metal shell 10 having a layer of suitable heat insulation material 11 covering its outer surface. The assembly is suspended, for downward thermal expansion, from a suitable supporting framework (not shown), this suspension preferably being effected by hangers secured to framework and to brackets on shell 10. At its lower end, shell 10 has an outwardly offset portion 18 merging with a hopper shaped bottom portion 21. Portion 21 is connected, by an expansion joint 22, to a smaller diameter cylindrical metal shell 23 having a refractory lining 24 constituting a slag disposal well, collection receptacle, or ash can 20 receiving slag from reaction unit 30 through a slag outlet 15. The slag disposal chamber contains a suitable liquid, such as water, which chills to a solid the molten slag dripping into the liquid from outlet 15. The solidified slag may be removed from slag receptacle 20, either continuously or periodically, by a suitable slag conveyor, or conventional type, generally indicated at 25.

In a manner described more fully hereinafter, the interior surface of shell 10 is lined with shell protecting tubes 51 forming part of the steam generator 50 and arranged as a cylindrical bank substantially covering the inner surface of shell 10 and defining the generating chamber. The tubes 51 are connected, at their lower ends, into interconnected annular headers 52 and 53 and, at their upper ends, into the steam and water drum 55 of generator 50. Adjacent headers 52 and 53, some of the tubes 51 are inwardly offset and exposed to form a support for the refractory floor or bottom of reaction unit 30, to define part of the slag outlet 15 and absorb heat from the slag and any gases flowing through outlet 15. The upper inner periphery of the offset tube portions support a water cooled "monkey coil" 29 acting as a slag dam for forming the refractory bottom or floor of reaction unit 30 and further defining the slag outlet.

The refractory floor of reaction chamber 30 may be of any suitable refractory material. For example, it may comprise packed refractory 31 covering the offsets of tubes 51 and arranged to receive slag 38. The refractory wall lining 32 of chamber 30 may likewise be of any suitable type. For example, it may comprise plastic refractory packed against studded portions of tubes 51 and covered by built-up layers of refractory shapes.

The reactants are introduced into reaction unit 30 through burners 35. In the arrangement shown, a plurality of burners 35 are arranged to extend into reaction unit 30 in circumferentially spaced relation at a zone substantially at the dividing line between upper and lower wall lining sections. These burners are so arranged that their outlets are directed downwardly, and preferably radially toward slag outlet 15, so as to facilitate the maintenance of the temperature at the slag outlet at a value sufficiently high to assure the slag remaining fluid to flow through outlet 15 and into collection receptacle 20. As indicated at 57, certain of the tubes 51 are bent away from shell 10 at the burner locations to provide the burner ports. These bent away portions 57 also serve as an additional support for the upper portions of refractory lining 32 so that the portions of the refractory lining of unit 30 below the burner level may be removed and replaced without disturbing the upper portion of the refractory wall lining. This is advantageous in practice, as, due to the eroding effect of the swirling and burning gases in the lower portion of unit 30, replacement of the lower portion of the refractory wall is required more often than is replacement of the upper portion of the refractory wall.

The burners 35 deliver the combustible mixture of a solid, carbon-containing fuel, in the pulverized state, steam, and a free oxygen-containing gas into the reaction unit 30. The free oxygen-containing gas is provided in an amount less than that required for complete combustion of the fuel, and the reactants undergo an exothermic reaction in the lower portion of unit 30 which raises the temperature of the reactants to the optimum range for subsequent endothermic reaction of the steam with the products of the preponderantly exothermic reaction to form the synthesis gas. As fully set forth in the copending application of P. R. Grossman and T. S. Sprague, Serial No. 225,346, filed May 9, 1951, now Patent No. 2,801,158, the coal gasification or synthesis gas reaction is effected in two distinct zones, with a preponderantly exothermic reaction taking place in the lower portion of unit 30 and a preponderantly endothermic reaction taking place in the upper portion of unit 30. The level of the outlets of burners 35 represents the dividing plane or zone between these two reaction zones, the elevation of the zone of reactant admission, together with the downward firing toward the slag outlet, confining substantially all of the exothermic reaction to that portion of reaction unit 30 located below the outlets of burners 35.

The amount of free oxygen contained in the oxygen-containing gas introduced through burners 35 is dependent upon the desired chemical make-up of the synthesis gas. For example, in producing a synthesis gas which consists essentially of $H_2$ and $CO$, useful in synthesizing hydrocarbons, the free oxygen-containing gas may comprise commercially pure oxygen, which is substantially 99% $O_2$. On the other hand, if the synthesis gas produced is intended for use in synthesis of ammonia, a substantial portion of nitrogen may be included in the free oxygen-containing gas, this proportion ranging up to the usual 79% $N_2$ percentage normally present in the atmosphere. Preferably, and particularly in the present invention, the pulverized fuel is introduced through the burner in a stream of high temperature steam. The free oxygen-containing gas is also introduced through the burners, but is admixed with the fuel and steam only at the exit or outlet of each burner. The burners are provided with a liquid coolant circulating system, for heat protection, with the coolant supply being common with that for coil 29.

The pulverized fuel is delivered to burners 35 from a suitable mechanical pulverizer generally indicated at 40 and which may be any conventional mechanical pulverizing construction well known to those skilled in the art. This pulverizer, insofar as the present invention is concerned, includes outlet conduits 41 which are connected to the several burners 35 and, in a manner to be described, the pulverizer is "swept" by steam to entrain the pulverized fuel and deliver it to burners 35 fluid borne in the stream. The fuel to be pulverized, coal, coke, lignite, peat, or other solid carbonaceous fuel, is supplied from a hopper 42 to scales 43 from which it is delivered to feeders 44. These feeders deliver the fuel to a pocket sealer 46 of known construction, which delivers the fuel to the inlet 47 of pulverizer 40 while maintaining the pulverizer pressure-sealed. In the arrangement shown, pulverizer 40 is driven by a steam turbine 45 supplied with steam from steam generator 50, all in a manner described more fully hereinafter.

The steam generator 50 includes the liquid and vapor drum 55 extending transversely of the upper end of shell 10 and covered with the insulation 11. The axis of drum 55 is offset somewhat from a diameter of shell 10, and the drum is disposed in, and closes, an opening in the top of shell 10. A convection type steam generating section 60, comprising a plurality of substantially parallel liquid and vapor containing tubes 61, connects the liquid space of drum 55 into a much shorter drum 65 forming the liquid drum of the steam generator. Drum 55 is suspended, through the medium of U-shaped hangers, from the structural framework and supports drum 65 through the medium of convection section 60.

Downcomers 62 extend between the liquid space of drum 55 and the annular headers 52 and 53, these downcomers being preferably located exteriorly of shell 10 and connected into the ends of drums 55. As stated, the upper ends of the shell protecting tubes 51 are also connected into the liquid space of drum 55, with the portions of tubes 51 above the upper edge of the refractory lining of unit 30 being exposed to the hot gases to form a radiant heating section.

At an elevation a short distance above the upper end of the refractory lining of unit 30, alternate tubes 51 are bent inwardly away from the inner surface of shell 10 to define the gas passes for the steam generator and to form a slag screen 64 in front of a superheater 70. This superheater, shown as a pendant type by way of example only, comprises serial looped tubes 71 connecting a superheater inlet header 72 to the superheater outlet header 73. The superheater tubes 71 extend through the upper end of shell 10 to connect into the headers 72 and 73, which are disposed in a chamber formed by an arched section 74 of insulation 11, this arched section extending substantially parallel to, and laterally offset from, drum 55.

The alternate tubes 51 bent inwardly away from shell 10 may be suitably enlarged to form the baffles defining the gas passes for generator 50, or may be enlarged and also provided with plate studding to define the baffles. These bent tubes form a first baffle 63 which slopes inwardly and upwardly to deflect the hot gases toward the slag screen 69. The inner end of baffle 63 supports a pier 64 engaging lower drum 65, and which may be formed of cast refractory or built up of refractory shapes.

As best seen in Figs. 2 and 3, the bent-in tubes 51 also provide parallel, vertical side baffles 76 embracing the ends of lower drum 65 and defining a gas pass 75 which is substantially rectangular in plan. Gases enter pass 75 through slag screen 64 and flow across superheater 70 and convection section 60, and thence into an outlet 75.

The outlet 75 is formed by bending alternate tubes 51 away from the inner surface of shell 10, as indicated at 81. The outlet 75 directs the gases into a short conduit section 82 extending outwardly and downwardly from shell 10, and joined by an expansion joint 83 to a conduit section 84 directing the relatively cooler gases over an economizer 80 disposed in a casing 86 supported on the main supporting framework. Water is admitted to the economizer section through an inlet header 91 at the lower end of the economizer, flows upwardly through the economizer and into an outlet header 92 at the upper end thereof, from which it is delivered to the liquid drum 65, the connection therebetween being omitted to simplify the drawing. The relatively cooled gases are delivered from casing 86 to a product gas outlet 93 communicating with the lower end of casing 86. A small conduit 94 extends from outlet 93 into slag collection receptacle 20 through the refractory lining section 27, this conduit being provided with a damper 90. By means of damper control conduit 94 a draft is created through slag outlet 15 so as to effect a controlled bleeding of hot gases from reaction unit 30 through slag outlet 15 to maintain an adequately high temperature at the slag outlet.

In accordance with the present invention, saturated steam from the liquid and vapor drum 55 is utilized to power turbine 45. This steam is directed to turbine 45 through a saturated steam line 95 connected to saturated steam outlet 95'. Another saturated steam line 96 is branched from steam line 95 so that steam generated, in excess of that required to power turbine 45 and to meet the process steam requirements, may be delivered to another point of utilization, line 96 being known as a by-product steam line. Exhaust steam from turbine 45 is fed by a line 97 to the inlet header 72 of superheater 70. The reheated or superheated exhaust steam is taken from superheater outlet header 73 by a line 98 connected, through the carrier fluid inlet of pulverizer 40 to the pulverized fuel space of the pulverizer. This reheated or superheated steam sweeps the pulverizer to entrain the pulverized fuel and deliver the pulverized fuel and steam to burners 35. To provide for the case in which the steam requirements of turbine 45 are less than the process steam requirements, a by-pass connection 99 controlled by a valve 100 interconnects saturated steam supply line 95 and exhaust or return line 97. Thereby, the steam required by the process, in excess of that required to operate turbine 45, can by-pass the turbine for delivery to superheater 70.

The operation of the invention will best be understood by referring to a typical practical embodiment thereof. In this embodiment, pulverized carbonaceous fuel entrained in steam, and at a temperature of approximately 250° F. dependent upon the moisture content of the fuel, is delivered from burners 35 at a pressure of approximately 4 p. s. i. g., being admixed with commercially pure oxygen at the exits of burners 35. In the preponderantly exothermic reaction of the oxygen, carbon and steam in the lower portion, or primary chamber, of reaction unit 30, the temperature of the reactants is raised to a value substantially in excess of 2,500° F., and after the preponderantly exothermic reaction between products of combustion and the steam, which takes place in the upper half, or secondary chamber, of reaction unit 30, the temperature of the synthesis gas leaving the reaction unit may be of the order of 2500° F. Some of the heat is extracted from the synthesis gas by the upper portions of the wall protecting tubes 51. The somewhat cooled gas flows through slag screen 64 and, through gas pass 75, across superheater 70 and convection section 60. These heat absorption elements are so designed that the temperature of the gas leaving through the product gas outlet 93, after heat transfer to economizer 80, is substantially 400° F.

In the particular illustrative example, extraction of heat from the synthesis gases generates approximately 14,000 pounds per hour of saturated steam at 250 p. s. i. g. The process steam requirements are approximately 6760 pounds per hour of superheated stem. Consequently, this amount of saturated steam is delivered to turbine feed line 95 at a temperature of approximately 406° F., and the balance of the steam, amounting to 7240 pounds per hour, is delivered as by-product steam through line 96. Turbine 45 requires 2700 pounds of saturated steam per hour, so that 4060 pounds per hour are delivered from line 95 to exhaust line 97 through by-pass 99 by adjustment of valve 100. In driving the turbine, the pressure of the saturated steam is reduced to 100 p. s. i. g., and the exhaust and by-pass steam at substantially this pressure is delivered to superheater inlet header 72. In superheater 70, the exhaust and by-pass steam is raised to 750° F. at 10 p. s. i. g., and this steam is delivered by line 98 to pulverizer 40 to sweep the pulverizer and entrain the pulverized fuel for delivery through burners 35. The latter are supplied with oxygen, in this example, through feed lines generally indicated at 105.

The foregoing illustration is exemplary only and the steam balance would be substantially different for another installation, depending upon the desired synthesis gas output and other factors. Also, and as stated hereinafter, the oxygen-containing gas may be a mixture of oxygen and nitrogen, for example, rather than commercially pure oxygen, depending upon the ultimate use of the synthesis gas.

While a specific embodiment of the invention has been shown and described in detail to illustrate the application of the invention principles, it will be understood that the invention may be embodied otherwise without departing from such principles.

What is claimed is:

1. In the method of continuously producing a synthesis gas by introducing, into a confined reaction zone, solid carbon-containing fuel in the pulverized state, free-oxygen containing gas in an amount less than that required for complete combustion of the fuel, and superheated steam, effecting in such confined zone an initial preponderantly exothermic reaction of the fuel, gas, and steam to elevate the temperature level of the reactants to a value within the optimum temperature range for the endothermic reaction of the steam with the products of such preponderantly exothermic reaction, completing a preponderantly endothermic synthesis gas reaction as a stream of gaseous products of such preponderantly exothermic reaction, steam, and any unreacted fuel particles is continuously withdrawn from such zone, and cooling the resultant synthesis gas: the improvement comprising effecting a transfer of heat from the major portion of such synthesis gas into a confined body of water to generate saturated steam; utilizing energy from at least a portion of such saturated steam to pulverize the solid fuel while maintaining such saturated steam out of contact with the solid fuel; adding heat to the saturated steam from which energy has been so extracted by further heat transfer from such major portion of the synthesis gas to superheat the steam; and utilizing the superheated steam to convey the pulverized fuel in suspension into such confined reaction zone to provide the superheated steam requirements for the synthesis gas production.

2. In the method of continuously producing a synthesis gas by introducing, into a confined reaction zone, solid carbon-containing fuel in the pulverized state, free-oxygen containing gas in an amount less than that required for complete combustion of the fuel, and superheated steam, effecting in such confined zone an initial preponderantly exothermic reaction of the fuel, gas, and steam to elevate the temperature level of the reactants to a value within the optimum temperature range for the endothermic reaction of the steam with the products of such preponderantly exothermic reaction, completing a preponderantly endothermic synthesis gas reaction as a stream of gaseous products of such preponderantly exothermic reaction, steam, and any unreacted fuel particles is continuously withdrawn from such zone, and cooling the resulting synthesis gas: the improvement comprising effecting a transfer of heat from the major portion of such synthesis gas into a confined body of water to generate saturated steam; utilizing energy from at least a portion of such saturated steam to pulverize the solid fuel while maintaining such saturated steam out of contact with the solid fuel; adding heat to the saturated steam including that from which energy has been so extracted by further heat transfer from such major portion of the synthesis gas to superheat the steam; and introducing the steam so superheated into contact with the fuel after pulverization and utilizing the superheated steam so introduced to convey the pulverized fuel in suspension into such confined reaction zone to provide the superheated steam requirements for the synthesis gas production.

3. In apparatus for continuously producing a synthesis gas by the reaction at elevated temperatures of a solid carbon-containing fuel in the pulverized state, a free-oxygen containing gas in an amount less than that required for complete combustion of the fuel, and superheated steam, and of the type comprising a shell having a product gas outlet and enclosing a reaction chamber, and burner means for introducing the reactants into the chamber: the improvement comprising a steam generator disposed in said shell in the path of flow of the synthesis gas from the chamber gas outlet to the product gas outlet to extract heat from the synthesis gas to generate saturated steam, and having a saturated steam outlet; mechanical fuel pulverizing means having a fuel inlet, a fuel outlet connected to said burner means, and a fluid inlet in communication with said fuel outlet; a steam turbine driving said pulverizing means; a connection between said saturated steam outlet and the turbine inlet; a steam superheater disposed in said shell in such path of flow of the synthesis gas; a connection between the turbine exhaust and the inlet of said superheater for superheating of said saturated steam; and a connection between the outlet of said superheater and said fluid inlet of said pulverizing means to entrain pulverized fuel in the superheated steam for delivery to said burner means, and to supply the superheated steam requirements for the synthesis gas reaction.

4. The improvement defined in claim 3 including a controlled saturated steam by-pass connection in parallel with said turbine.

References Cited in the file of this patent

UNITED STATES PATENTS

| | | |
|---|---|---|
| 1,530,281 | Murrie | Mar. 17, 1925 |
| 2,515,542 | Yellott | July 18, 1950 |
| 2,662,007 | Dickinson | Dec. 8, 1953 |
| 2,686,113 | Odell | Aug. 10, 1954 |
| 2,698,227 | Peery et al. | Dec. 28, 1954 |

FOREIGN PATENTS

| | | |
|---|---|---|
| 533,877 | Great Britain | Feb. 21, 1941 |

OTHER REFERENCES

American Gas Assn. Publication CEP 54–24, "Pipeline Gas from Coal" by E. J. Pyrioch et al. May (1954) (24 pages).

Perry: "Chemical Engineers' Handbook," 3rd edition, 1959, page 1147.